(12) United States Patent
Rigole

(10) Patent No.: US 7,983,960 B2
(45) Date of Patent: *Jul. 19, 2011

(54) SYSTEMS AND METHODS FOR ONLINE SELECTION OF SERVICE PROVIDERS AND MANAGEMENT OF SERVICE ACCOUNTS

(75) Inventor: Rod Rigole, Los Angeles, CA (US)

(73) Assignee: Leod Network Holdings L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/725,397

(22) Filed: Mar. 16, 2010

(65) Prior Publication Data

US 2010/0179882 A1 Jul. 15, 2010

Related U.S. Application Data

(60) Continuation of application No. 11/553,386, filed on Oct. 26, 2006, now Pat. No. 7,707,071, which is a division of application No. 09/753,982, filed on Jan. 2, 2001, now Pat. No. 7,139,728.

(60) Provisional application No. 60/173,881, filed on Dec. 30, 1999.

(51) Int. Cl.
*G06Q 30/00* (2006.01)
(52) U.S. Cl. ............. 705/26.41; 705/26.43; 705/26.44
(58) Field of Classification Search ............. 705/14.4, 705/1.51, 14.53, 14.54, 14.55, 14.56, 26, 705/35, 26.41, 26.42, 26.43, 26.44
See application file for complete search history.

(56) References Cited

U.S. PATENT DOCUMENTS

| | | | |
|---|---|---|---|
| 4,491,947 | A | 1/1985 | Frank |
| 4,972,453 | A | 11/1990 | Daniel, III et al. |
| 5,109,337 | A | 4/1992 | Ferriter et al. |
| 5,159,685 | A | 10/1992 | Kung |
| 5,220,501 | A | 6/1993 | Lawlor et al. |
| 5,297,031 | A | 3/1994 | Gutterman et al. |
| 5,483,637 | A | 1/1996 | Winokur et al. |
| 5,495,610 | A | 2/1996 | Shing et al. |

(Continued)

FOREIGN PATENT DOCUMENTS

WO WO-9639689 12/1996

OTHER PUBLICATIONS

"Final Office Action", U.S. Appl. No. 11/553,386, (Oct. 14, 2009), 12 pages.

(Continued)

*Primary Examiner* — Nicholas D Rosen
(74) *Attorney, Agent, or Firm* — Perkins Coie LLP

(57) ABSTRACT

An interchange party computer system (IPCS) having means for presenting user interfaces to consumer computer systems and capturing data input through the user interfaces, the IPCS being associated with at least one database holding data representing a plurality of consumer profiles, the profiles including consumer profiles expressing service selection attributes for a plurality of service sectors, and at least one database holding data for a plurality of service programs under a plurality of service sectors, each sector being represented by service programs from a plurality of service providers, the IPCS including (a) a Service Comparison/Selection; (b) a Automatic Bill Payment Module; (c) an Automated Services Monitoring Module; (d) an Automated Best Services Selection Module; (e) a Services Search Module; (f) an Incentive Program Module; (g) a Data Mining Module; and/or (h) a Pooling Module.

28 Claims, 3 Drawing Sheets

U.S. PATENT DOCUMENTS

| | | | |
|---|---|---|---|
| 5,513,343 | A | 4/1996 | Sakano et al. |
| 5,539,877 | A | 7/1996 | Winokur et al. |
| 5,611,048 | A | 3/1997 | Jacobs et al. |
| 5,611,052 | A | 3/1997 | Dykstra et al. |
| 5,621,663 | A | 4/1997 | Skagerling |
| 5,646,864 | A | 7/1997 | Whitney |
| 5,655,068 | A | 8/1997 | Opoczynski |
| 5,694,546 | A | 12/1997 | Reisman |
| 5,696,975 | A | 12/1997 | Moore et al. |
| 5,699,527 | A | 12/1997 | Davidson |
| 5,729,735 | A | 3/1998 | Meyering |
| 5,758,328 | A | 5/1998 | Giovannoli |
| 5,761,502 | A | 6/1998 | Jacobs |
| 5,764,543 | A | 6/1998 | Kennedy |
| 5,768,501 | A | 6/1998 | Lewis |
| 5,819,028 | A | 10/1998 | Manghirmalani et al. |
| 5,832,196 | A | 11/1998 | Croslin et al. |
| 5,835,896 | A | 11/1998 | Fisher et al. |
| 5,864,483 | A | 1/1999 | Brichta |
| 5,864,662 | A | 1/1999 | Brownmiller et al. |
| 5,883,955 | A | 3/1999 | Ronning |
| 5,890,175 | A | 3/1999 | Wong et al. |
| 5,893,905 | A | 4/1999 | Main |
| 5,895,454 | A | 4/1999 | Harrington |
| 5,907,490 | A | 5/1999 | Oliver |
| 5,953,707 | A | 9/1999 | Huang et al. |
| 5,966,699 | A | 10/1999 | Zandi |
| 5,974,391 | A | 10/1999 | Hongawa |
| 5,974,395 | A | 10/1999 | Bellini et al. |
| 5,974,403 | A | 10/1999 | Takriti et al. |
| 5,983,220 | A | 11/1999 | Schmitt |
| 5,987,423 | A | 11/1999 | Arnold et al. |
| 5,995,947 | A | 11/1999 | Fraser |
| 5,999,525 | A | 12/1999 | Krishnaswamy et al. |
| 6,000,610 | A * | 12/1999 | Talbott et al. ............... 235/383 |
| 6,006,016 | A | 12/1999 | Faigon et al. |
| 6,006,196 | A | 12/1999 | Feigin et al. |
| 6,026,383 | A | 2/2000 | Ausubel |
| 6,058,426 | A | 5/2000 | Godwin et al. |
| 6,067,525 | A | 5/2000 | Johnson et al. |
| 6,104,868 | A | 8/2000 | Peters et al. |
| 6,105,069 | A | 8/2000 | Franklin et al. |
| 6,151,582 | A * | 11/2000 | Huang et al. ..................... 705/8 |
| 6,157,915 | A | 12/2000 | Bhaskaran et al. |
| 6,167,378 | A | 12/2000 | Webber, Jr. |
| 6,195,697 | B1 | 2/2001 | Bowman-Amuah |
| 6,199,204 | B1 | 3/2001 | Donohue |
| 6,219,700 | B1 | 4/2001 | Chang et al. |
| 6,253,339 | B1 | 6/2001 | Tse et al. |
| 6,256,676 | B1 | 7/2001 | Taylor et al. |
| 6,289,462 | B1 | 9/2001 | McNabb et al. |
| 6,314,565 | B1 | 11/2001 | Kenner et al. |
| 6,324,522 | B2 | 11/2001 | Peterson et al. |
| 6,345,239 | B1 | 2/2002 | Bowman-Amuah |
| 6,347,398 | B1 | 2/2002 | Parthasarathy et al. |
| 6,349,237 | B1 | 2/2002 | Koren et al. |
| 6,427,132 | B1 | 7/2002 | Bowman-Amuah |
| 6,470,496 | B1 | 10/2002 | Kato et al. |
| 6,487,718 | B1 | 11/2002 | Rodriguez et al. |
| 6,606,606 | B2 | 8/2003 | Starr |
| 6,606,744 | B1 | 8/2003 | Mikurak |
| 7,096,193 | B1 | 8/2006 | Beaudoin et al. |
| 7,139,728 | B2 * | 11/2006 | Rigole ............................. 705/26 |
| 7,707,071 | B2 | 4/2010 | Rigole |
| 2001/0039508 | A1 | 11/2001 | Nagler et al. |
| 2001/0049632 | A1 | 12/2001 | Rigole |
| 2002/0010608 | A1 | 1/2002 | Faber et al. |

OTHER PUBLICATIONS

"Final Office Action", U.S. Appl. No. 09/753,982, (May 1, 2006), 8 pages.

"Non Final Office Action", U.S. Appl. No. 09/753,982, (Apr. 9, 2004), 5 pages.

"Non Final Office Action", U.S. Appl. No. 09/753,982, (Aug. 16, 2005), 10 pages.

"Non Final Office Action", U.S. Appl. No. 09/753,982, (Nov. 9, 2004), 8 pages.

"Non Final Office Action", U.S. Appl. No. 11/553,386, (Mar. 18, 2009), 14 pages.

"Notice of Allowance", U.S. Appl. No. 11/553,386, (Dec. 7, 2009), 10 pages.

"Notice of Allowance", U.S. Appl. No. 09/753,982, (Jul. 26, 2007), 7 pages.

"TDB-ACC-NO: NNRD428118, UK, Customer premium providing wireless clients access to consolidated broadband services", *IBM Technical Disclosure Bulletin, Issue 428*, (Dec. 1, 1999), p. 1682.

Anonymous, "MCS Data Base Facilitates Member Exchange", *CPA Management Consultant*, vol. 7 No. 4, (Fall 1993), p. 7.

Kirzner, "Leveling Intelligence for Data Searches", *Open Computing*, (Nov. 1995), 2 pages.

Oxman, Steven W., "Level5 Quest", *Level 5 Quest, IEEE Expert*, (Oct. 1995), pp. 80-82.

Ricciuti, M. "Query Tools Link Internet with SQL Data", *Info World*, vol. 17 Issue 31, (Jul. 31, 1995), 1 page.

Unknown, "Level 5 Quest (R), The fastest, surest way to sift through mountains of data—Document unavailable—Cited in parent U.S. Appl. No. (09/753,982) in a Non-Final OA (Apr. 9, 2004) by the examiner", *Level Five Research, Inc.*, (1995), 12 pages.

* cited by examiner

SYSTEMS AND METHODS FOR ONLINE SELECTION OF SERVICE PROVIDERS AND MANAGEMENT OF SERVICE ACCOUNTS

RELATED APPLICATIONS

This application is a Continuation of and claims priority to U.S. Non-Provisional patent application Ser. No. 11/553,386, now U.S. Pat. No. 7,707,071, filed Oct. 26, 2006 that is a divisional of U.S. Non-Provisional patent application Ser. No. 09/753,982, now U.S. Pat. No. 7,139,728, filed Jan. 2, 2001 which claims the benefit of and priority to U.S. Provisional Application 60/173,881, filed Dec. 30, 1999, the disclosures of which are incorporated herein by reference as if set forth in their entirety for all purposes.

BACKGROUND

There are thousands, if not hundreds of thousands, of websites which sell products online. Some of these websites sell products within a particular category (e.g. eToys for toys), while others have emerged as online shopping malls (e.g. Amazon.com's, Bizrate.com, zShops) where consumers can find a variety of products which are not necessarily related or within a particular category. However, one area of commerce has been relatively ignored with the proliferation of dot.com businesses. This neglected area of eCommerce is services.

Not surprisingly, many partial substitutes exist in the marketplace. The major telecom companies advertise their "rate plans" on their websites and numerous websites offer cellular phone or paging services. Utilities.com from IdeaLab offers utilities in certain markets. Mortgage.com and others offer home loans. Numerous websites offer automobile insurance.

While there are entities which sell or promote services online, services ranging from accounting to website design, there is not a single website which provides adequate systems and methods that allow the consumers and businesses to shop in one place for services under a variety of service sectors—an online "services mall" so to speak.

The systems and methods for making, processing, and accepting online applications for a particular kind of service are known. For example, U.S. Pat. No. 5,966,699 of Zandi, entitled "System and Method for Conducting Loan Auction over Computer Network" discloses, among other things, systems of an online auction of a loan. The '699 patent is hereby incorporated by reference for all that is disclosed therewithin as if set forth herein in its entirety. Similarly, U.S. Pat. No. 5,995,947 of Fraser, et al., entitled "Interactive Mortgage and Loan Information and Real-Time Trading System" discloses, among other things, an online loan application system. The '947 patent is hereby incorporated by reference for all that is disclosed therewithin as if set forth herein in its entirety. However, none of the aforementioned sites or systems provides one-stop shopping for consumers to compare and shop for services on-line and manage, update, add or cancel service accounts across a variety of different service sectors using a single or minimal number of user interfaces.

One probable reason why there is not a single website that adequately addresses the needs of consumers and business shopping for a variety of services is the fundamental differences between providers of goods and providers of services. Goods are tangible items that are typically manufactured according to standard specifications and priced independent of the attributes of a particular consumer. Goods are often standardized so that they are suitable for a large population of consumers. In contrast, services are often provided and priced depending on the unique attributes and circumstances of a particular consumer or group of consumers. To illustrate the differences, a microwave oven can be purchased by a consumer regardless of the consumer's location, age, level of education, etc. On the other hand, a service program such as health insurance might depend on all the foregoing. In further illustration, another service such as mortgage brokerage services might depend on a different set of consumer characteristics such as the consumer's annual income, estimated market value of home, credit history, etc. Because of the unique nature of each individual seeking services and the unique nature of the characteristics required by service providers to produce service pricing and offerings, there has yet to be a system or methods that allow consumers to have a single source for a variety of service needs over a variety of service sectors.

As can be appreciated from the foregoing discussion, there are many complexities and logistics associated with the online selection of service providers. While there have been some attempts toward reducing the time and effort involved in the process, existing systems and methods have problems that need to be addressed. Accordingly, there is a substantial need for systems and methods that enable one-stop shopping for consumers to compare and shop for services on-line, manage, update, add and/or cancel service accounts across a variety of different service sectors.

SUMMARY OF THE INVENTION

The present invention provides systems and methods that overcome the problems in the prior art. The systems and methods may be implemented through a website that serves as an intermediary or "interchange party" between consumers/businesses needing services and the service providers. The interchange party allows consumers and businesses (hereinafter "consumers" means consumers and/or businesses) access to a variety of different services from a variety of different service providers over a variety of service sectors. Hereinafter the consumers in need of services, the interchange party, and/or the service providers may be referred to as a "participating party" or "participating parties". The present invention's advantages include the following, alone or in various combinations with each other:

systems and methods that allow consumers and businesses to shop and compare services in one place on-line;

systems and methods that allow consumers and businesses to achieve savings over the short term and long term from online and/or automated handling of transactions with a variety service providers over a variety of service sectors;

systems and methods that free consumers and businesses from time-consuming, tedious processes of paying bills and managing accounts;

systems and methods that automatically notify consumers and businesses of service offerings that better suit their needs and/or automatically enrolls consumers and businesses in better service programs;

systems and methods that reward consumers and businesses through incentive and pooling programs;

systems and methods for mining data and reporting to participating parties information derived from the mining and/or designing service programs based on information derived from the mined data;

systems and methods for "single entry" of data which may be presented to, accessed by, or gathered by a plurality of participating parties having a need for or interest in the data or information generated therefrom ("single entry" means that only one participating party needs to enter data or information needed by or of interest to other participating parties); and other systems and methods that are expressly described herein or are contemplated herein and will be apparent to persons skilled in the art from the teachings herein.

Technologies for implementing the systems and methods of the present invention may include any number or combination of technologies well known to persons skilled in the art, such as database technologies like SQL (Oracle, DB2, or Microsoft), and programming languages useful in web programming such as ASP/JSP, JavaScript, Perl, CGI, XLM, COM/DCOM, Java, etc.

DETAILED DESCRIPTION OF THE INVENTION

Figure 1:
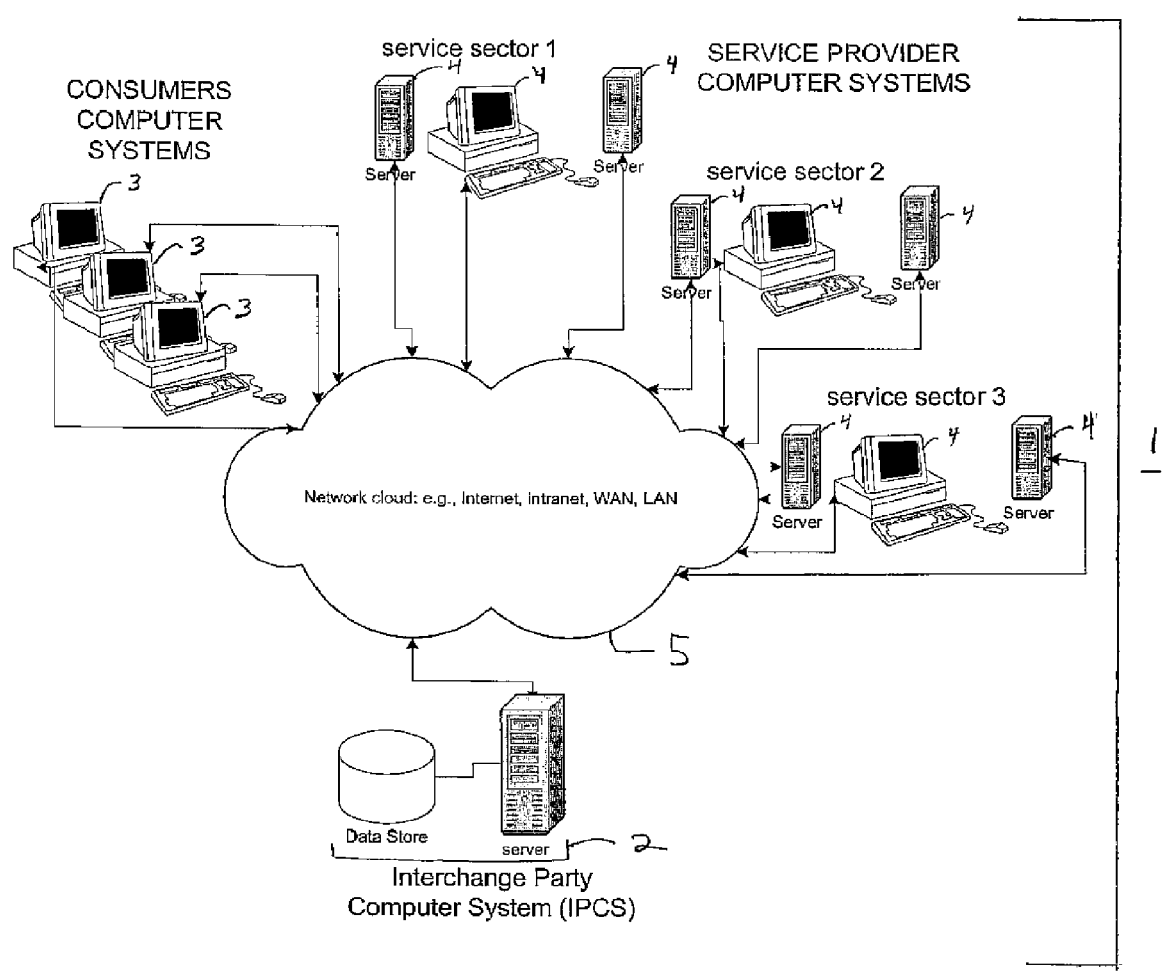
FIG. 1 shows an overview of computer systems in network communication.

The present invention provides systems and methods that, among other things, enable consumers to compare and shop for services on-line, manage, update, add and/or cancel service accounts across a variety of different service sectors.

In one possible embodiment, the present invention provides a website included in an Interchange Party Computer System ("IPCS") that allows consumers to select from a variety of different services from a variety of different service providers. It is designed to give the consumer information so that they can make an informed choice. It is also designed to make the selection and transfer process easy and without any disruption in service. In this regard, the present invention provides user interfaces that streamline the selection of service providers and the management of service accounts. The IPCS website may be organized by service sector, such as long distance telephone or utilities. Once the consumer selects the desired service sector, a listing of service providers for that particular category is provided. At this point, the consumer can use a criteria feature to list the services in order of preference based upon one or more selected characteristics, such as price or service level. The consumer can then select a particular service provider and review the pertinent service information. And once the consumer decides on a particular service and provider, an online enrollment process provides data fields for the consumer to input their identifying information. The information is then processed, the selected service initiated, and the consumer is sent a confirming email or other electronic message. The service provider and consumer information is stored on computer systems, i.e., servers or databases on part of the IPCS, on third party provider computer systems associated with the IPCS or at a service provider computer system associated with the IPCS.

The IPCS provides one or more of the following features: automatic bill payment; an intelligent agent for providing information updates about service programs; a best service program that provides information as to which choices best meet the needs of a consumer or business; search engine for finding service providers; incentive programs that award services and businesses subscribing to services through the provided system; data mining features for extracting information based on consumer and business transactions with service providers participating in the system. These, and additional features, are described more fully below. They can be selected by the consumer at any time from the IPCS. The IPCS website providing the online storefront of service providers may receive a sign-up fee and/or an ongoing percentage of the billings for the service. A portion of these "fees" may be returned to the consumer in the form of incentive points.

As described in more detail below, the present invention provides a means for a consumer to create a single profile that may be used by a plurality of service providers providing a plurality of different services to provide offers for service.

The systems, methods, and features of the present invention may be implemented through a Selection and Transaction Network ("STN"), a system of networked computers that permits participating parties to exchange information and engage in online transactions with each other relating to the provision of services over a variety of service sectors. The STN generally means a system that permits input, transfer, managing and computing of data and/or information relative to different participating parties relating to one-stop shopping for consumers. The IPCS is at the heart of the STN and provides a single website which, among other things, allows consumers to compare and shop for services on-line, create, manage, update, add and/or cancel service accounts across a variety of different service sectors. The STN system may be described in terms of the computer systems controlled by participating parties and supporting parties (e.g., credit checking agencies) which may play an ancillary role in transactions between consumers and service providers.

One advantage of the STN is that it enables "single entry" of data so that only one participating party needs to enter data needed by or of interest to a plurality of other participating parties, and to deliver it to the other parties, and the party entering the data needs to enter it only once. Generally, "data" means facts and beliefs about the real world; "information" is data that has been processed and formatted to support decision-making Data may be processed to generate information. Information may also be processed to generate further information. The information that has been processed may itself be data depending on the context. "Data" or "information" includes data and/or information formatted into or as electronic files. For convenience herein, the terms "data" and "information" shall each be inclusive of both data and information, unless otherwise expressly or contextually indicated.

FIG. 1 shows an overview of an STN 1, according to the present invention. The STN includes the computer systems of the participating parties in the STN, namely IPCS 2, a plurality of consumer computer systems 3, a plurality of service provider computer systems 4, and supporting party computer systems (not shown).

The plurality of service provider computer systems 4 can be grouped under a plurality of service sectors, each sector being represented by a plurality of service providers in the sector. For the benefit of consumers, the more sectors and service providers that are represented in the STN, the more convenient the STN will be for consumers, and the better the competition will be among service providers to provide price reductions and values to the consumers. Although the present invention is not limited to any specific number of service sectors or service providers under a sector, it would be advantageous to consumers to have at least five different service sectors represented in the STN. It would be advantageous to consumers to have at least three service providers represented under at least five service sectors. It would be even more advantageous to consumers to have at least seven different service sectors represented in the STN. It would be even more advantageous to consumers to have at least five service providers represented under at least seven service sectors. It would be particularly advantageous to consumers to have at least ten service sectors. It would be particularly advantageous to consumers to have at least seven service providers represented under at least ten service sectors.

The STN 1 may be used to communicate data between the participating parties or other computer systems. For example, it may capture data from electronic application forms presented on electronic pages such as web pages or email pages; other electronic forms; verification or approval forms or files, etc. The system may include means to organize captured data into records in a database or into known electronic file formats; it may transmit or present data to other participating party computer systems; it may evaluate, process, or otherwise compute data and information; and/or it may receive data from others involved in the transactions and communication between or among participating parties.

Looking more specifically at IPCS 2, it electronically facilitates communications and transactions between at least two other participating parties, namely consumers and service providers. Computer systems in system STN 1 may be networked over LANs, WANs, the Internet or other known network systems 5 using known protocols for such systems, including TCP/IP. To illustrate the range of possible computer systems that may be present in STN 1, computer systems are represented as servers and PCs. This is merely for example purposes.

Figure 2:
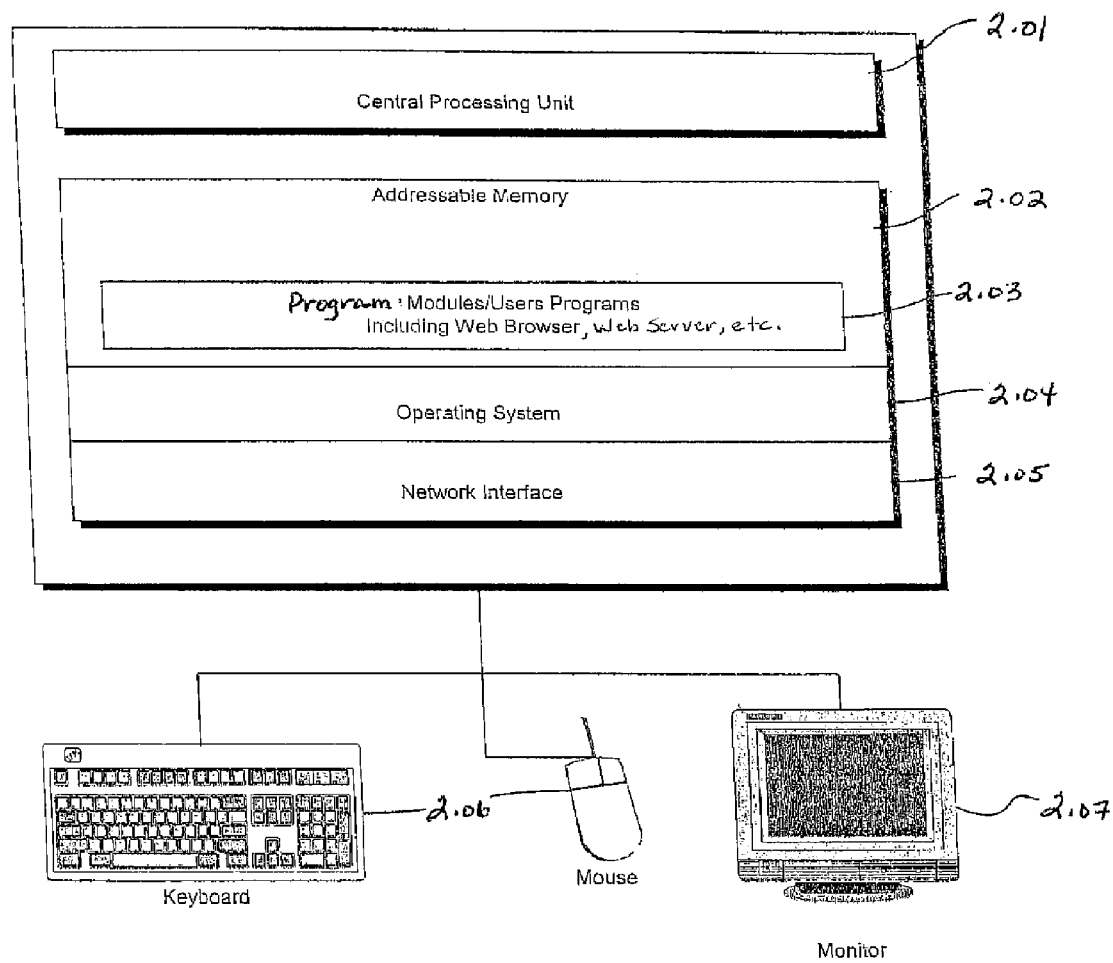
FIG. 2 illustrates features that would be typically found in a computer system that is included in the system of FIG. 1.

FIG. 2 illustrates features that may be typically found in a computer system e.g., 2, 3, or 4 of a participating party or other party in STN system 1. As used herein a "computer system" generally means a set of hardware and software components as is known in the art. A computer system 2, 3, or 4 generally includes: central processing unit ("CPU") 2.01; memory (RAM or ROM) 2.02, software applications or program modules 2.03, operating system 2.04 and network interface 12.05, and related I/O subsystems. A computer system may include one or more of the following: disk drive, input devices such as keyboard or mouse 2.06, display monitor 2.07, networking card, other subsystems known in the art, web browsers, web servers, database management system software, and/or communications software. It will be understood by persons skilled in the art, that a computer system may also be in the form of a Personal Digital Assistant (PDA), a wireless computer system or device capable of communications over the Internet or other network, or a computer terminal (thin client) or Internet appliance capable of such network communications.

A "participating party's computer system" is a computer that is substantially under the operational control of a participating party and does not necessarily need to be owned by a party. For example, the computer system used by a consumer at an Internet Cafe would be a consumer computer system while under the control of a consumer. Similarly, a participating party's computer system could conceivably serve multiple rolls. For example, an insurance company service provider computer system could also be a consumer computer systems if it was being used by an insurance company employee to select long distance telephone service for the company from the IPCS. A participating party computer system may be in the form of a distributed system not under a single housing or roof but having the distributed components under the operational control of a participating party.

A participating party's computer system may include hardware and software for data capture. Such components may be referred to as a "data capture server. A data capture server's functions include accepting data transfer from one or more data sources that may be outside a participating party's computer system. The source of the data may be another participating party's computer system. Data may also enter a data capture server by direct manual input or connection to storage medium such as a CD-ROM, disk drive, floppy drive, memory cards, ZIP drive cartridges, and the like. Appropriate parsing applications could parse the data captured from forms into appropriate database records and fields. XML based applications are suitable for authoring forms, transferring data into the database, and extracting data and information from a database.

A participating computer system may further comprise or include software and hardware for presenting data to other computer systems. Such components may be referred to as a "presentation server". In certain embodiments, the presentation server is a web server for an Internet or intranet website that serves web pages to other participating parties through browsers in their computer systems. The web pages may be served via known TCP/IP protocols and formatted in known formats of standardized mark up languages such as HTML and XML.

Computer systems of system 1 may execute a conventional operating system, including, but not limited to, Microsoft Corporation's Windows (.sup.SM) 3.x, 95, 98, 2000, ME, NT or DOS operating systems; Linux operating systems; Sun Microsystems' Unix Solaris operating systems; IBM's AIX Solaris operating systems; SGI's IRIX Solaris operating systems or other operating systems, including, but not limited to Window's CE, Palm OS, etc. for PDAs, cellular devices, web devices, or other computing devices. The possible software components of a computer system described herein, including operating system and application software, may reside on one or more hardware components providing addressable memory for the computer system.

A participating party's computer system may manage data, including access, retrieval, transfer, addition, deletion, modification and/or storage of data in any variety of known data storage media, including local hard drive, CD-ROM or other mass storage device, local area network servers, wide area network servers, storage resources substantially under the control of the participating party on a server that is shared with other parties (including servers shared with other participating parties, such as a server provided by an IPCS, as described below), and local RAM, if data is generated on demand or linked to other programs such as spreadsheet or database programs executing in RAM.

Data and information may be formatted by a participating party's computer system for printing, viewing, transfer to another computer system, storage in any of many known formats, including, Adobe PDF; rich text (RTF); SGML formats including HTML and XML; ALLAIRE Cold Fusion CFML; MICROSOFT ASP; JAVA Script MICROSOFT Word, Excel, Access; bitmap, JPEG, GIF, and other graphics standards. It could also be presented in audio or video formats such as WAV, JPEG, and MP3 formats.

The STN 1 may generally be divided into a client side system of participating party computer systems 3 and 4 or network terminals and a server system of IPCS 2.

In a preferred embodiment, IPCS 2 includes a server with a set of program modules 2.03. Each module is a set of software objects and/or program elements, collectively having the ability to execute independently in a separate thread or logical chain of process execution. Each module may be executed as a separate logical server or using a separate physical device. However, for clients such as the consumer computer systems 3 and service provider computer systems 4, the IPCS server may operate as a single logical server available using the network 5.

Various services available to consumers and service providers through the IPCS are discussed in detail below under certain headings for each service. Other modules relating to technical implementation of the services are as follows. The IPCS may include a login module for controlling access to resources on IPCS 2. This module is responsible for password checking, access control, and assignment of a particular service program module to service the client. Each participating party computer system is serviced by a specific login module. The IPCS also may include a consumer module and service provider module for handing all server-side application requirements of consumer computer systems and service provider computer systems, respectively. The IPCS also includes an administration module that handles all server-side application requirements of an administration station associated with the IPCS.

The IPCS may also include various external interface modules for converting incoming data, such as application or enrollment form data to a format for communication with the respective application module or database. The IPCS may also include various external service modules. Each external service has a module for communicating with an external service and for obtaining information in a format required by the external service. For example, one of the external service modules could be used to obtain credit scores and reports from credit reporting agencies. Another module that may be included on the IPCS is a notification module. This module handles notification and electronic mail communication with the participating parties. The IPCS may include a database interface module. This module handles all interface requirements between application modules and the databases. For example, the database interface module manages (a) the number of simultaneous connections to the database such that the total number is maintained within applicable license agreements; and (b) any integrity problems in interactions between application modules and the databases. Thus, this module allows the IPCS to be connected to different types of databases such as relational databases or object-oriented databases. Another module that may be included in the IPCS is a consumer profile module. This module receives the consumer profile data sent to the IPCS and performs intake operations on the data so that it may be used in other modules.

The present invention contemplates that participating parties will create and manage database records, input and manage data, upload files, communicate, compute data, collaborate, and exchange things with each other through their respective computer systems. The data and files may be transferred or presented to computer systems by participating parties via user interfaces developed in Standardized General Markup Languages (SGML), scripting languages, and other known languages or protocols. Such languages and protocols include MICROSOFT ASP, CFML, JAVASCRIPT, JAVA, COM, CGI, HTML, and/or XML. To provide the foregoing functionality, the user interfaces would typically be in the nature of electronic pages such as web pages or email pages that, through appropriate computer code from such languages, are associated with databases, web servers, web browsers, file servers, network communications links, email programs, etc. The electronic pages could be static pages stored on a server or database or pages dynamically created through appropriate scripts, for example.

For purposes of example and not limitation, the contemplated data types used in the STN include details supplied by a consumer to an online service application, enrollment form, or request for quote of service program details. For example, the details could be supplied to an application for auto insurance; to a consumer profile form that includes fields for consumer attributes and/or service selection criteria. Likewise, service providers could communicate data representing details of a service program offered by a service provider, e.g. terms of insurance coverage such as costs, limits, and deductibles.

Hereinafter "consumer profile" data means any data supplied by a consumer for use by the IPCS in a program module 2.03(*a*)-(*h*), discussed below. It includes data relating to a consumer's personal attributes, service sector interests, service provider and/or service program selection criteria or preferences. Hereinafter "service provider profile" means any data supplied by a service provider for use by the IPCS in a program module 2.03(*a*)-(*h*), discussed below. It includes data relating to a service provider's service sector, company information, and service programs and/or offerings. A data capture server associated with a computer system of a participating party may assign data to a database, import or convert the data into a file format, or make the data accessible to application software (program modules), which may process, evaluate, or otherwise compute the data.

STN 1 may include one or more web servers for presenting and/or capturing data. IPCS 2 would usually include or otherwise be directly associated with a web server and associated data store or database, as indicated in FIG. 1. As used herein, a web server generally refers to a computer system that runs web server software that enables access by remote computer systems or terminals via the Internet or other network transport to allow presentation of data and information typically in the form of web pages or streaming media; data and information storage and transfer; and other transactions or processes that are known in the art to occur on web servers. Suitable web server software is well known and includes Apache Software Foundation's Apache Server web server; Netscape's FAST-TRACK series web server, Microsoft Corporation's IIS, and Sun Microsystems' JAVA WEB SERVER. A web server in IPCS 2 may be associated with appropriate scripts to process captured data or to present processed data.

To illustrate certain features of the present invention, the following description is in terms of an online application for auto insurance. However, persons skilled in the art will recognize that this is not a limiting example but serves as a representative example of how the present invention could be applied for a variety of different services over a variety of service sectors. In this example, an online application may be presented to a participating party, such as a consumer, from any number of sources including the IPCS 2 or an insurance broker's website. In the latter regard, the IPCS may include web pages with a link to the insurance broker's website. An application, enrollment form, or response to a consumer's request for information may also be emailed or otherwise electronically communicated to a consumer by the IPCS 2 or service provider computer system 4. The application may also be presented to an insurance broker or other participating party that completes the application on behalf of a consumer, or assists the consumer in completing the application.

In a preferred embodiment, the auto insurance application for presentation to a participating party is located on a web server that is part of the IPCS 2 or otherwise associated therewith. In the case of online auto insurance, the application may be served to the consumer through HTML, XML, Java Script, ActiveX, Applet, CFML, MICROSOFT ASP, or through other known mechanisms or formats that can be retrieved by a consumer through a conventional web browser or other known interface. (Other servers in system 1 may use the same mechanisms or formats for interfacing with web browsers on other computers.)

After a consumer completes an application or other form, the resulting application data is captured by a data capture server in the IPCS and logged into a server log. The log records the collected data and may assign an identifier or key value to the data. For example, the identifier could be an indicator of any number of things including the time of receipt, source (e.g., the particular consumer's name or login id), etc. The logged data may then be parsed by a software module program or script that assigns items of the raw data into predefined fields in a database in IPCS 2. Data input by consumers into electronic forms may be parsed, for example, by custom software, available freeware, or commercially available XML parsers, in the case of XML form data. The parsing program may be created or adapted using standard program techniques that are known or within the skill of persons in the art. The parsing program would be designed to map data from, for example, the auto insurance application into database records. Alternatively or simultaneously, the data may be directed by a script or other program directly into a program module for processing the data.

In a database for storing the application data, each record would be composed of one or more fields that correspond to the class of an item of data and/or the value of an item of data. Any field may be keyed to any one or more other fields. For example, in the case of a loan application, the database would contain tables that include a field for attributes (application details) such as age; place of residence; amount of insurance coverage sought; service subscription details, desired deductibles, billing and account details, incentive program details, etc.

In like manner, database records may be created for any other consumer profiles, service provider profiles, and other categories of collected data. It is contemplated that a single consumer may create a single master profile, or any number of separate profiles relating to, for example, separate service sectors.

Databases may be based on any number of known DBMSs, including hierarchical databases, network databases, relational databases, and object oriented databases. Suitable DBMS are widely available and include Oracle, Sybase, Microsoft SQL Server, and DB2. One suitable database system is a relational database based on SQL language. A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine and can be accessed by various querying means, including Boolean logic evaluation, proximity calculations, and fuzzy logic evaluation. The databases of the present invention may also be custom designed, the design process and features being well within the skill of persons in the art. U.S. Pat. No. 5,983,220 of Schmitt, entitled "Database Evaluation System Supporting Intuitive Decision in Complex Multi-Attributive Domains Using Fuzzy, Hierarchical Expert Models" discloses, among other things, systems and methods for constructing and querying databases and returning and presenting results of database queries. The '220 patent is hereby incorporated by reference for all that is disclosed therewithin as if set forth herein in its entirety.

One or more data channels may be defined for the transmission of data between components of a single computer system or between different computer systems. As used herein "data channel" means a logical event, not necessarily a physical channel, directing the flow of data into computer storage and/or processing systems. Data channels are determined by the structure of, for example, a loan application, or the way answers are coded into database fields, and the programs that are to operate on predefined categories or items of data. A data channel may also be a logical or computed combination of other data channels. More specifically, there could be a data channel assigned to each service application or enrollment form attribute. For example, data from a database in IPCS may be introduced into one or more program modules 2.03(*a*)-(*h*) (described in more detail elsewhere herein) that perform a predetermined operation on data. The database in IPCS 2 is also in communication with a server in IPCS 2, as indicated in FIG. 1. The server may be a web server for interfacing with the remote computer systems of participating parties in STN 1. The web server of IPCS 2 may be used to present data from any associated database to remote computer systems 3, 4, or other remote system, over a network 5. The data may be presented in any known format, including HTML, XML, PDF, CFML, MICROSOFT ASP, and other formats noted elsewhere herein or that are known in the art. Alternatively, a presentation server, which may be the same as, part of, or separate from the web server in IPCS 2, could present the data to a printer or video display or computer system, or through other means for displaying data.

One or more of data channels may communicate data from a database associated with IPCS 2 to applications in the IPCS or other participating party's computer system calling for stored data. It will be understood that any other components of STN 1 may communicate defined fields of data to another system component along a data channel assigned to a field(s) of data. For service applications, enrollment forms, etc., the predefined data channels may include one or more data channels for transmitting data relating to a service application or enrollment form details; consumer profiles; service offering details; terms of service; billing details; payment details, etc. It is to be understood that such data channels are for illustrative purposes only and should not be construed as a limitation on how data may be communicated between system components.

One or more program modules 2.03 may be included in one or more participating party computer systems to process data output from another participating party to generate desired forms of information or to initiate transactions between participating parties, as described below. Preferably, the modules are included in or otherwise directly associated with IPCS 2. Information processed in IPCS 2 may be presented to an end-user in any known form of communicating information, including: printed reports, emailed reports; server-stored reports accessible to end-users over a public or private network, including website posted reports. In a preferred embodiment, a presentation server in IPCS 2 may serve web pages to remote computers systems through conventional TCP/IP protocols or other known protocols. The web pages may be presented through conventional web browser applications such as INTERNET EXPLORER series of web browsers by Microsoft Corporation, or the NETSCAPE COMMUNICATOR series of web browsers by Netscape Communications Corporation.

Service Comparison/Selection Module

The IPCS 2 may include or be associated with a computer system that includes an Automated Service Monitoring Module 2.03(*a*). In one possible embodiment, the module operates as follows. IPCS 2 allows consumers to shop and compare services from a variety of service providers over a variety of service sectors. These service sectors include those that consumers pay for on a monthly basis, for a flat fee or for free. The service sectors include, without limitation, telecom (local and long distance, cellular, paging, voice over IP, calling cards, etc.), utilities (gas, electric, water, heating oil), cable television, Internet service, satellite television broadcast systems, financial (credit cards, banking, stocks, bonds, mutual funds, retirement planning, etc.), loans (home and auto), and insurance (home owners, automobile, life, health etc.). However, these sectors represent just a few examples of the available service sectors that could be included in the system of the present invention.

The IPCS also allows consumers to compare services based on certain criteria or attributes selected by the individual consumer in creating or updating a consumer profile for use in querying a database of service providers or programs. The IPCS either could contain a database with service provider profiles or could be associated with another computer system, e.g., service provider computer systems with appropriate databases containing details of service programs. Database queries can be structured in a number of ways that could produce useful information. For example, a consumer could create a consumer profile to query the database(s) based on sectors of service, service providers, attributes of service (e.g., price, coverage, term, deductibles, etc.).

To illustrate, the consumer could select health insurance, ISP, and long distance phone service sectors in a search for best service programs in each sector. The consumer could select further attributes to help define a best program in a sector. Attributes could include price, company rating, in the case of ISPs, number of hours included in a flat rate plan, etc. Search results could be returned to the consumer according to preferences, interest or profile attributes. For example, If a consumer is most concerned with price, the available services can be listed in order from least expensive to most expensive, given the same scope of service. If a consumer is most concerned with service levels, the available services can be listed in order from highest rated service levels to least. If a consumer's profile indicates a particular region of residence, results could be returned according to a service provider's proximity to the region. Other parameters, or combinations thereof, may also be selected and/or weighted by the consumer to develop a results list.

The above-described comparison/selection service could be provided to users free of charge. Fees may be provided from the service provider in the form of sign-up fees and/or ongoing percentages of the monthly billings.

Automatic Bill Payment Module

The IPCS 2 may include or be associated with a computer system that includes an Automatic Bill Payment Module 2.03 (*b*). In one possible embodiment, this module operates as follows. The module helps consumers to avoid the time consuming, often painstaking task of paying bills each month. The Internet billing and payment service allows consumers to securely receive and view electronic copies of their monthly bills on their personal computers in the comfort and privacy of their own homes. The users can control the amount and timing of their electronic payments, manage their own payment records, and save the time and expense of making payments through traditional mail.

According to the present invention, the bills are forwarded, either electronically or via mail, to the IPCS 2 or a selected third party e-billing provider, such as PAYMYBILLS.COM or YAHOO!. The bills may be parsed, scanned or otherwise input into the site operator's computer system, e.g., the IPCS. The IPCS notifies the consumer by email or other electronic messaging or notification system when the bill "arrives," i.e., is processed. At that point, the consumer reviews the bill online, selects the amount of payment, and when the funds are to be transferred. When the appropriate time arrives, the site operator transfers the funds from the consumer's bank to the billing party. In a preferred embodiment, a consumer logs into the website provided on the IPCS and accesses a web page for managing one or more service provider accounts. The web page either provides or links to other pages that show bills from the service providers. The web page(s) include user interfaces that allow the consumer to input payment amounts and other details related to making a payment. The consumer can then send the payment electronically to the service provider. The IPCS acts to route the data relating to the payment to the consumer's financial institution responsible for making the payment (e.g., bank, credit union, credit card company etc.) and simultaneously to the service provider. When the service provider receives payment, it will update the consumer's account to reflect that payment has been received. The IPCS can also be updated with the details of the transaction. The consumer may access the updated account information through the IPCS or directly through a website on the service provider's computer system. In an alternative embodiment, the consumer can use web page user interfaces on the IPCS to authorize the payment to occur in a truly automatic mode. In other words, based on instructions issued by the consumer through the IPCS, amounts that are due under one or more accounts will automatically transfer to the service provider on a given date without user intervention. Of course, bills could be electronically transmitted to the consumer before or after the transaction so that the consumer has an opportunity to question unusual charges.

It is anticipated that the automatic bill payment feature would be provided to consumers for free, a monthly fee, or a per transaction fee.

Automated Services Monitoring Module

The IPCS 2 may include or be associated with a computer system that includes an Automated Services Monitoring Module 2.03(*c*). In one possible embodiment, the module operates as follows. The module automatically notifies consumers if a service becomes available which better suits their needs or preferences, as reflected in consumer profiles. These "needs" or "preferences" can be based on price, service levels, or other distinguishable qualities. The consumer accesses the IPCS via user interfaces such as web pages stored on the IPCS and creates a profile by entering or calling up present service attributes and prioritizing certain service criteria, such as price or service levels for each service sector of interest. The profile is stored and used periodically in a query of the service program databases. And, if another service becomes available which surpasses the selected criteria, the consumer is notified via email or other electronic messaging or notification means, such as instant message, or updates to an account page on the IPCS or a web portal of particular service provider or a portal for a collection of service providers. The notification preferably includes means to accept a service program and institute services. A page on the IPCS for a consumer's personal access may also be automatically updated in the IPCS database to post service program offerings and/or to reflect changes in service programs that are offered. Typically, this feature would be provided to consumers for free, for a fee per transaction, or for a monthly fee. The foregoing features could also be used to notify the consumer of offerings in service sectors where the consumer is not enrolled in a service but for which the consumer has created a profile expressing interest.

Automated Best Services Selection Module

The IPCS 2 may include or be associated with a computer system that includes an Automated Best Services Selection Module 2.03(*d*). One possible embodiment of this module is as follows. The module is similar to and may work in conjunction with the Automated Services Monitoring Module referenced above. Once the Automated Best Services Selection Module finds a service which better suits the needs or preferences of a consumer, the consumer can be automatically switched to that service directly by the IPCS. According to the present invention, the consumer selects this feature, provides authorization for the site operator to act on their behalf with respect to service selection, and creates a profile (s) by entering present service attributes and prioritizing certain service criteria, such as price or service levels. The profile is stored in a database included in or associated with the IPCS. Periodically, the program module included in or associated with the IPCS determines whether a profile matches a service offering provided by a service provider. The attributes for a service offering are also stored on a database included in or associated with the IPCS. An example of an associated database containing service offering attributes would be a database maintained by a service provider. If the program module on the IPCS determines that another service becomes available which surpasses the selected criteria in a consumer profile, the consumer is automatically switched to that service. Alternatively, the consumer may be prompted by email or other electronic messaging or notification system (e.g. web page accessible by consumer) that a better a matching service has come available. The user can then electronically accept the service offering through a user interface presented with or otherwise associated with the electronic page having the details of matching services. The current service criteria is then stored, and is maintained until another service provider is found which surpasses the then current criteria. The foregoing features could also be used to enroll the consumer in service sectors where the consumer is not enrolled service but for which he or she has created a profile expressing interest.

In one embodiment, the consumer's profile is automatically created from the consumer's existing subscription of services. Using well-known programming techniques, a parsing or database querying program may be written that looks up details of each user subscription stored in a database or file on the IPCS. The program then parses or searches for predetermined attributes that are in the file or database and creates a profile therefrom. The profile may then be compared against service provider programs or offerings for matches.

In the foregoing embodiments, the program module may be set to not only return full matches but also partial matches. A consumer may be automatically enrolled based on a partial match, if the consumer has agreed to some criteria for partial matches. Alternatively, the consumer may be presented details of the partial match and prompted for acceptance or rejection.

This feature could be provided to consumers for a monthly fee, for free, or for a per-transaction fee. The functionality can be provided directly by the IPCS 2 or subcontracted to a third party provider.

Services Search Module

The IPCS 2 may include or be associated with a computer system that includes a Services Search Module 2.03(*e*). One possible module is as follows. The Module allows consumers to search for services that are not represented on the system site. The consumer enters certain descriptors or "keywords" and then initiates a search. The search results are listed in order of relevance. This feature would normally be provided to consumers for free and powered by one of the many available search engines such as AltaVista, Yahoo!, Excite, or by a custom developed search engine.

Incentive Program (Universal Points.™ System) Module

The IPCS 2 may include or be associated with a computer system that includes an Incentive Program (Universal Points.™ System) Module 2.03(*f*). One possible embodiment is as follows. The module allows consumers to accumulate "points" based on the services they have selected using the IPCS and the monthly billings for such services. Consumers accumulate Universal Points.™ or U-Points.™ based on the monthly dollar amounts paid to the service providers participating in the IPCS website program. The consumer can then "cash in" their U-points for selected prizes offered on the site. The number of U-Points required for a particular prize varies depending on the cost of such prize. The prizes are provided by sponsors which may be given advertising on the website in lieu of payment.

Data Mining Module

The IPCS 2 may include or be associated with a computer system that includes a Data Mining Module 2.03(*g*). One possible embodiment of this module is as follows. The module allows the IPCS to analyze a potential consumer's bills and spending habits to determine if another service offered through the IPCS better suits their needs. Through strategic partnerships with financial planning entities and bill payment services, the IPCS will be able to mine the data of consumers and then offer most cost effective solutions. Data mining software could be custom designed or obtained from commercial sources. For example, data mining software is commercially available from a variety of commercial sources. For example, SPSS, Inc, Chicago, Ill. (www.spss.com) produces various commercial software products for data mining. In addition to the foregoing, the data mining could be directed to other needs of participating parties. The data may be analyzed or processed to generate statistical, demographic, and other pertinent information about consumers; service programs; consumer satisfaction with service providers; service programs and/or offerings; and market research information. The Data Mining module could be ported to or otherwise integrated with the Incentive Program Module to support the functionality of other modules 2.03 described herein, such as the Incentive Program Module or the Pooling Module.

Pooling Module

The IPCS may include or be associated with a computer system that includes a Pooling Module 2.03(*h*). One possible embodiment is as follows. As the IPCS base grows, so will the potential to negotiate better rates with the service providers. Once a particular service and/or service provider reaches a critical mass of consumers and monthly billings, the IPCS automatically or through administrators will contact the respective service provider computer systems or administrators and negotiate better rates for its patrons. The consumers may be given incentives to participate in pooling programs offered by certain service providers or groups of service providers. For example, consumers could be notified that if the total number of consumers enrolled in a certain program reaches a particular level, the cost of service to the consumer will decrease a certain amount. The discounts could automatically be applied through the IPCS pooling module and consumers notified accordingly. In another embodiment that could be implemented in conjunction with the Data Mining Module, service providers are notified of total enrollment of consumers in a particular service sector across a variety of service providers in the sector. Based on the numbers, service providers could offer pooling programs or other special offers through the IPCS. The Automated Best Services Monitoring Module and Automated Best Services Selection Module could also be integrated into the foregoing so that consumers automatically learn of or are enrolled in service programs that best match their profiles.

In view of the foregoing, it can be seen that combinations of the foregoing modules 2.03(*a*)-(*h*) in the IPCS should result in substantial synergies, improving significantly over the prior art.

Figure 3:
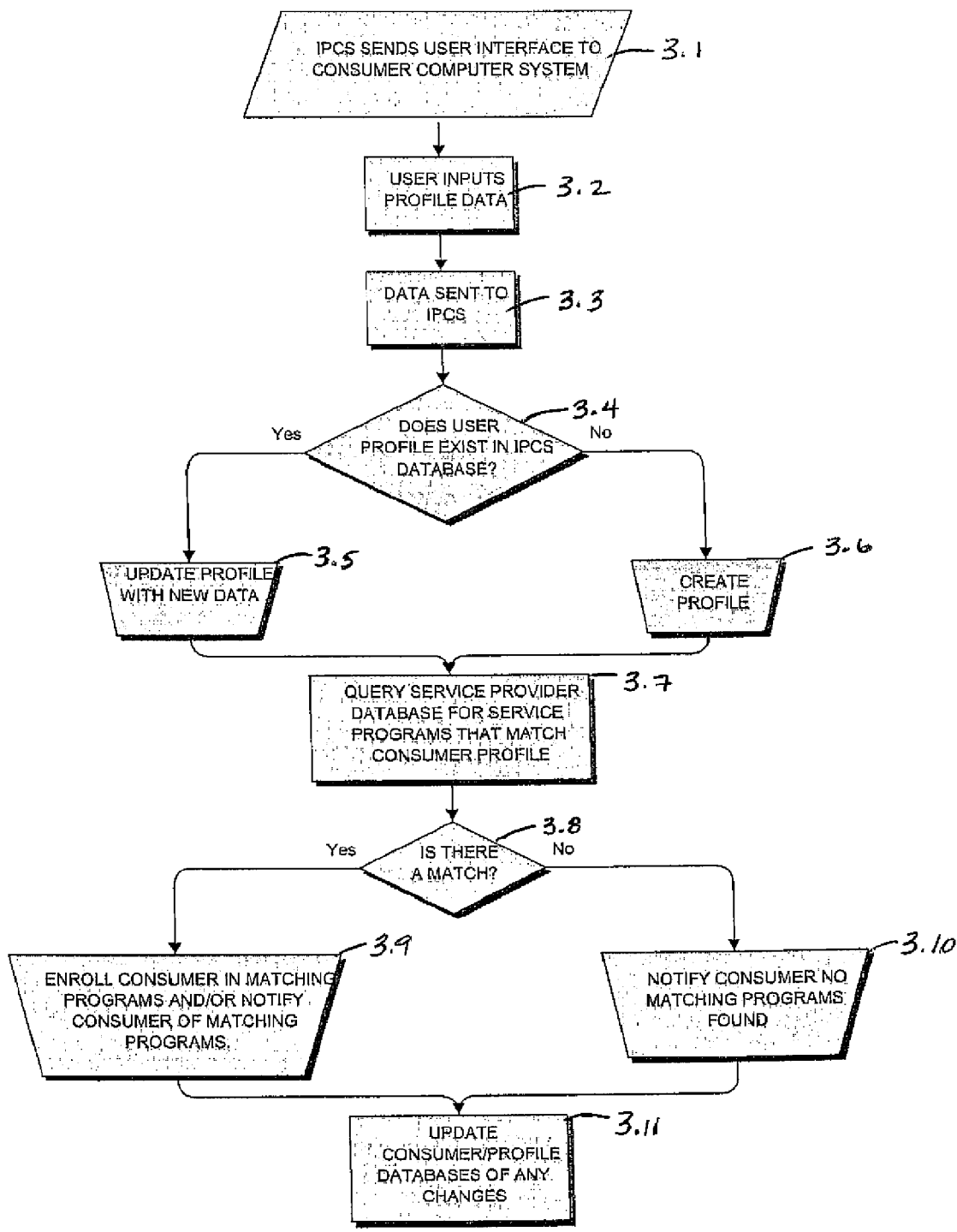
FIG. 3 is a flowchart representing a general overview of some method steps according to the present invention.

FIG. 3 shows certain general, overview steps performed by or in connection with the IPCS relative to program modules 2.03(a)-(h). Other steps are as noted above. In step 3.1, the IPCS sends a consumer an electronic page with a user interface for inputting consumer profile data. The consumer inputs data 3.2 relative to a transaction under one or more of program modules 2.03(a)-(h). The data is sent 3.3 to the IPCS. The IPCS determines 3.4 if a profile relating to the transaction already exists. If a corresponding profile does not exist, one is created 3.6 and stored in a database that is part of or otherwise associated with the IPCS 2. If a corresponding profile exists, it is updated 3.5 as necessary.

Data captured from a user interface form may be used to construct and submit a query 3.7 to a database(s) of service provider profiles to determine 3.8 matching programs or offerings. The query can include instructions to return partial matches. It is also noteworthy that the captured data can be directly used in a query without first storing data in a database associated with IPCS 2.

If a program is found that matches (this might be a partial match where partial matches are deemed acceptable) a consumer profile to a predetermined degree, the consumer may be automatically enrolled 3.9 in the program(s) or offering(s) or notified 3.9 of such programs or offerings. If a matching program or offering is not found, the consumer may be notified 3.10. Although not shown in FIG. 3, the query 3.7 may be periodically run again to monitor for updates to the services provider profile database(s). In step 3.11, the consumer and/or service provider databases may be updated to show new enrollments, status of offerings, etc.

The business model of the present system may generate revenue to the operator of the IPCS in one or more ways, including: a service provider "signing bonus," a percentage of the monthly service provider, billings and/or advertising revenue.

Typically, service providers pay signing bonuses to brokers or resellers when they sign up a new consumer. For every service consumer that signs up through the system site, revenue will be generated in the form of the signing bonus. In addition, it is common for service providers to pay brokers or resellers a percentage of a consumer's monthly service fees to prevent "churning." This commission varies according to the particular service and provider, however, this will add to revenue on a monthly basis. Lastly, revenue may be generated from the advertisements, banner or otherwise, which appear on the site.

Other revenue streams may be generated from the fees charged to consumers for certain site features, including the automatic bill payment service or automatic best services selection. Where the system site does not provide the particular feature or service internally, revenue streams will be generated from the commissions paid by the third party providing the feature.

Other possible sources of revenue include promotional fees paid by the selected services search engine and the selling of the consumer list.

Example Features for Administration of Participating Party Computer Systems

The IPCS may include one or more of the following administrator resources:

administrator resources that allow an administrator of the IPCS, or a participating party authorized by the administrator, to post content or input data to the IPCS or computer systems associated with the IPCS;

administrator resources for setting access permissions, security procedures, and login procedures for participating parties;

administrator resources that allow a participating party to control who has access to IPCS resources; and administrator resources that allow participating parties to post certain kinds of content to IPCS 2.

To streamline the interchange of data and files between participating parties, the interchange party may provide other participating parties standardized electronic pages in the nature of customizable forms, formats or templates for the creation of data input forms. As indicated above, the forms could be provided in electronic pages written in SGML such as HTML or XML. For consumer participating parties, the pages could include predefined form fields for input of data such as name, address, age, and other consumer attributes. A master consumer profile form could allow a user to create a profile that would be as comprehensive as possible for the attributes need by all sectors of service providers. The relevant portions of the profile could then directed to various service providers in various categories. It can also be used in the best services and automatic bill payment features, discussed above.

The forms could include popup menus so a consumer does not need to input every attribute, but can select choices from a menu list.

The IPCS may provide administrator interfaces for service providers or others on their behalf to input into the IPCS a service provider profile that includes details of their service programs, offerings, and other relevant information. The administrator interfaces may include, for example, customizable user interfaces in the form of web pages. A service provider may use and customize the web pages for presentation to consumers via the IPCS. For example the web pages could be customized to provide:

descriptions of service programs and offerings by the service provider;

price and other terms of service;

uploadable files to consumers in the form of applications or enrollment forms or in the form of informational material, guidelines, any other documents the service provider wishes to make available to consumers about the company or its services (the files could be uploaded in any number of formats including HTML, .pdf, XML, .gif, .tif, or text);

contact and company information;

links to the service provider's own website that resides on the service provider's own server and/or links to other relevant sites; and data input fields for consumers applying or enrolling in service programs online, paying for services, requesting information, etc.

The foregoing embodiments are for illustrative purposes and are not intended to be limiting, persons skilled in the art being capable of appreciating other embodiments from the scope and spirit of the foregoing teachings.

The invention claimed is:

1. A computer-implemented method comprising:
receiving consumer profile data over a communication network, the consumer profile data including data usable to facilitate communications and transactions between at least one consumer and at least one service provider;
querying one or more databases for service programs that match the consumer profile data to a predetermined degree; and
automatically enrolling the at least one consumer in a matching service program that matches the consumer profile data to the predetermined degree;
wherein at least one of the querying or automatically enrolling is performed by a computing device.

2. The computer-implemented method as recited in claim 1, further comprising periodically querying the one or more databases for other service programs that surpass the predetermined degree.

3. The computer-implemented method as recited in claim 1, further comprising, responsive to locating another service program that better matches the consumer profile data than the matching service program, automatically switching the consumer to the other service program.

4. The computer-implemented method as recited in claim 1, further comprising:
generating a notification for the consumer of an automatic enrollment in the matching service program; and
causing transmission of the notification to the consumer.

5. The computer-implemented method as recited in claim 1, further comprising analyzing consumer bills and spending habits to determine if another service better suits one or more needs of the consumer.

6. The computer-implemented method as recited in claim 1, further comprising causing presentation of an electronic page to enable input of the consumer profile data.

7. The computer-implemented method as recited in claim 6, wherein the receiving comprises receiving the consumer profile data via the electronic page.

8. A computer-implemented method comprising:
using consumer profile data associated with a consumer to ascertain service programs that match the consumer profile data to a predetermined degree, the service programs being associated with a plurality of service sectors, at least some individual service sectors being represented by service programs from a plurality of service providers; and
responsive to ascertaining a matching service program, automatically enrolling the consumer in the matching service program;
wherein at least one of the using or automatically enrolling is performed by a computing device.

9. The computer-implemented method as recited in claim 8, further comprising facilitating communication between the consumer and a service provider associated with the matching service program.

10. The computer-implemented method as recited in claim 8, wherein automatically enrolling comprises causing presentation of an application for enrollment that includes at least some of the consumer profile data to a service provider associated with the matching service program effective to enable the service provider to assist in completing the application for enrollment for the consumer.

11. The computer-implemented method as recited in claim 8, further comprising receiving authorization included in the consumer profile data to automatically enroll the consumer in the matching service program.

12. The computer-implemented method as recited in claim 8, wherein automatically enrolling the consumer is performed by automatically enrolling the consumer in a service program that partially matches the consumer profile data.

13. The computer-implemented method as recited in claim 8, further comprising:
ascertaining another service program that better matches the consumer profile data than the matching service program; and
automatically switching the consumer to the other service program.

14. The computer-implemented method as recited in claim 8, further comprising storing the consumer profile data, which includes selectable criteria selected by the consumer.

15. The computer-implemented method as recited in claim 8, further comprising using data from existing subscriptions of the consumer to create the consumer profile data.

16. A server comprising:
one or more processors;
one or more computer-readable media;
instructions stored on the one or more computer-readable media which, responsive to execution under the influence of the one or more processors, cause the server to perform operations comprising:
searching a database of service programs for service programs that match a consumer profile to a predetermined degree; and
responsive to a determination that a service program matches, automatically enrolling a consumer associated with the consumer profile in the service program that matches.

17. The server as recited in claim 16, wherein the operations further comprise:
periodically searching the database of service programs for another service program that surpasses the predetermined degree; and
responsive to locating the other service program that surpasses the predetermined degree, automatically switching enrollment of the consumer to the other service program.

18. The server as recited in claim 16, wherein the operations further comprise:
generating a notification for the consumer of an automatic enrollment in the matching service program; and
causing transmission of the notification to the consumer.

19. The server as recited in claim 16, wherein the database of service programs comprises service programs grouped under a plurality of service sectors, at least some individual sectors being represented by a plurality of service providers.

20. The server as recited in claim 16, wherein the operations further comprise analyzing consumer bills and spending habits to construct the consumer profile.

21. The server as recited in claim 16, wherein the operations further comprise causing presentation of an electronic page to enable construction of the consumer profile based on preferences of the consumer.

22. A server comprising:
one or more processors;
one or more computer-readable media;
instructions stored on the one or more computer-readable media which, responsive to execution under the influence of the one or more processors, cause the server to perform operations comprising:
receiving consumer profile data from a consumer computer system, the consumer profile data usable by an Interchange Party Computer System (IPCS) to query one or more databases of service programs for services that match the consumer profile data to a predetermined degree, the one or more databases holding data for a plurality of service programs under a plurality of service sectors, each sector being represented by service programs from a plurality of service providers;
querying the one or more databases for service programs that match the consumer profile data to a predetermined degree; and
causing presentation of information about matching service programs found in a query to the consumer computer system, the information comprising at least two notices of enrollment each presented on a different electronic page and each associated with a different service sector, at least one notice configured to notify the user of automatic enrollment in a service program that matches the consumer profile data to the predetermined degree and that is for a service under the respective service sectors.

23. The server as recited in claim 22, wherein the operations further comprise facilitating communication between the consumer computer system and a service provider associated with the service program.

24. The server as recited in claim 22, wherein the operations further comprise receiving authorization included in the consumer profile data to automatically enroll the consumer in the service program that matches the consumer profile data to the predetermined degree.

25. The server as recited in claim 22, wherein the operations further comprise automatically enrolling a consumer associated with the consumer computer system in the service program that matches the consumer profile data to the predetermined degree.

26. One or more tangible computer-readable media comprising instructions stored thereon that, responsive to execution by a computing device, cause the computing device to perform operations comprising:
   presenting at least one electronic page including information about service offerings for a plurality of service sectors;
   presenting at least one electronic page including an interface allowing input of profile data;
   receiving profile data through the interface;
   building a profile;
   presenting at least one electronic page allowing one or more of the following:
      application for or enrollment in service programs by completion of an online form and transmission of form data to a server or a computer system directly associated with the server;
      determination of matching offers for service through the server, the server to maintain a record of enrollments;
      establishment of automated bill payment with a service provider by transmission of a request for automated bill payment through the server;
      request of an automatic notification of offers of service programs matching a profile;
      authorization for automatic enrollment in one or more service programs matching the profile; and
      responsive to receiving a selection of authorization for automatic enrollment, enabling automatic enrollment of a consumer in the one or more service programs matching the profile.

27. The one or more tangible computer-readable media of claim 26, wherein the instructions allow streamlining of a selection of service providers and management of service accounts.

28. The one or more tangible computer-readable media of claim 26, wherein the at least one electronic page including information about service offerings for a plurality of service sectors is organized by service sector.

* * * * *

UNITED STATES PATENT AND TRADEMARK OFFICE
CERTIFICATE OF CORRECTION

PATENT NO. : 7,983,960 B2  
APPLICATION NO. : 12/725397  
DATED : July 19, 2011  
INVENTOR(S) : Rigole Page 1 of 1

It is certified that error appears in the above-identified patent and that said Letters Patent is hereby corrected as shown below:

Title page, item (57), under "Abstract", in Column 2, Lines 11-12, delete "a Automatic" and insert -- an Automatic --.

Page 2, item (56), under "Other Publication", in Column 2, Line 13, delete "(Jul. 26, 2007)," and insert -- (Jul. 27, 2006), --.

Signed and Sealed this
Twenty-seventh Day of December, 2011

David J. Kappos
*Director of the United States Patent and Trademark Office*